United States Patent
Ooiwa

(10) Patent No.: US 8,478,489 B2
(45) Date of Patent: Jul. 2, 2013

(54) FUEL VAPOR TREATMENT APPARATUS

(75) Inventor: Hidetoshi Ooiwa, Anjo (JP)

(73) Assignee: Denso Corporation, Kariya (JP)

( * ) Notice: Subject to any disclaimer, the term of this patent is extended or adjusted under 35 U.S.C. 154(b) by 4 days.

(21) Appl. No.: 13/288,279

(22) Filed: Nov. 3, 2011

(65) Prior Publication Data

US 2012/0130596 A1    May 24, 2012

(30) Foreign Application Priority Data

Nov. 18, 2010    (JP) ................ 2010-257745

(51) Int. Cl.
*F02M 21/02*    (2006.01)

(52) U.S. Cl.
USPC ............... 701/45; 701/110; 123/520; 137/48

(58) Field of Classification Search
USPC ............ 701/45, 110; 123/516, 518–521, 123/457, 461; 137/39, 47, 48, 50; 220/4.14, 220/749
See application file for complete search history.

(56) References Cited

U.S. PATENT DOCUMENTS

| | | | | |
|---|---|---|---|---|
| 5,479,905 A | * | 1/1996 | Ito | 123/520 |
| 5,535,719 A | * | 7/1996 | Morikawa et al. | 123/339.17 |
| 6,039,032 A | * | 3/2000 | Morikawa et al. | 123/520 |
| 6,367,459 B1 | * | 4/2002 | Yoshioka et al. | 123/520 |
| 7,347,191 B2 | | 3/2008 | Atwood et al. | |
| 2001/0029933 A1 | * | 10/2001 | Fabre | 123/520 |
| 2002/0017276 A1 | * | 2/2002 | Machida | 123/406.47 |
| 2002/0162535 A1 | * | 11/2002 | Machida | 123/406.45 |
| 2003/0226549 A1 | | 12/2003 | Takagi et al. | |
| 2003/0226550 A1 | * | 12/2003 | Mitsutani | 123/520 |
| 2005/0081612 A1 | * | 4/2005 | Hosoya et al. | 73/118.1 |
| 2005/0279406 A1 | * | 12/2005 | Atwood et al. | 137/39 |
| 2009/0266147 A1 | * | 10/2009 | Maegawa | 73/40.7 |

FOREIGN PATENT DOCUMENTS

| | | |
|---|---|---|
| JP | 2006-69359 | 3/2006 |
| JP | 2007-126987 | 5/2007 |

OTHER PUBLICATIONS

Japanese Official Action dated Oct. 19, 2012 issued in corresponding Japanese Application No. 2010-257745, with English translation.

* cited by examiner

*Primary Examiner* — Thomas Black
*Assistant Examiner* — Ce Li
(74) *Attorney, Agent, or Firm* — Nixon & Vanderhye P.C.

(57) ABSTRACT

A fuel vapor treatment apparatus includes a fuel tank, a canister, a passage forming member, a pressure-regulating valve, an acceleration detector, and a controller. The fuel tank is for a storage of fuel to be supplied to an internal combustion engine for a vehicle. The canister recovers fuel evaporated from the fuel tank. The passage forming member defines a passage through which the fuel tank and the canister communicate with each other. The pressure-regulating valve is provided in the passage forming member to connect or disconnect the fuel tank and the canister. The acceleration detector detects an acceleration value of the vehicle, and the controller controls the pressure-regulating valve based on the acceleration value detected by the acceleration detector.

5 Claims, 5 Drawing Sheets

FUEL VAPOR TREATMENT APPARATUS

CROSS REFERENCE TO RELATED APPLICATION

This application is based on and incorporates herein by reference Japanese Patent Application No. 2010-257745 filed on Nov. 18, 2010.

TECHNICAL FIELD

The present invention relates to a fuel vapor treatment apparatus.

BACKGROUND

Conventionally, a fuel vapor treatment apparatus, in which fuel vapor generated in a fuel tank of an internal combustion engine is recovered by a canister, is known. The fuel vapor recovered by the canister is supplied to an intake passage and is used for burning in the internal combustion engine. In Patent Document 1 (JP 2004-11561A corresponding to US 2003/0226549 A1), an open/close valve is provided in a passage which connects the fuel tank and the canister, so that isolation between the fuel tank and the canister is ensured in a fuel vapor leak check. Thus, accuracy of the fuel vapor leak check is improved. In Patent Document 2 (JP 2006-69359A), a fuel solidifying agent is mixed with fuel in a fuel tank, thereby preventing breakage of the fuel tank when a collision of a vehicle occurs.

However, in the fuel vapor treatment apparatus described in Patent Document 1, if the open/close valve is closed when the collision of the vehicle occurs, the fuel tank may be broken by an internal pressure in the fuel tank. In a fuel vapor treatment apparatus described in Patent Document 2, if the mixing of the fuel solidifying agent with the fuel is insufficient, the fuel tank may be broken when the collision of the vehicle occurs.

SUMMARY

The present invention addresses at least one of the above disadvantages.

According to an aspect of the present invention, a fuel vapor treatment apparatus includes a fuel tank, a canister, a passage forming member, a pressure-regulating valve, an acceleration detector, and a controller. The fuel tank is for a storage of fuel to be supplied to an internal combustion engine for a vehicle, and the canister is disposed to recover fuel evaporated from the fuel tank. The passage forming member defines a passage through which the fuel tank and the canister communicate with each other. The pressure-regulating valve is provided in the passage forming member to connect or disconnect the fuel tank and the canister. The acceleration detector is provided to detect an acceleration value of the vehicle, and the controller controls the pressure-regulating valve based on the acceleration value detected by the acceleration detector.

Thus, when the vehicle is subjected to an impact force, the impact force on the vehicle can be detected by the acceleration detector as the acceleration value, and the controller causes the pressure-regulating valve to be opened. Accordingly, fuel vapor in the fuel tank can be emitted into the canister which communicates with the fuel tank, and thereby the internal pressure of the fuel tank decreases. Therefore, breakage of the fuel tank can be prevented even when a collision of the vehicle occurs.

For example, the controller may include an acceleration determination section configured to determine whether the acceleration value detected by the acceleration detector is larger than an acceleration threshold. In this case, the controller causes the pressure-regulating valve to be opened when the acceleration determination section determines that the acceleration value detected by the acceleration detector is larger than the acceleration threshold.

Furthermore, a pressure detector may be provided in the fuel tank to detect a pressure in the fuel tank, and the controller may control the pressure-regulating valve based on the pressure detected by the pressure detector. In this case, the controller may include a pressure determination section configured to determine whether the pressure detected by the pressure detector is larger than an atmosphere pressure, and the controller may cause the pressure-regulating valve to be opened when the pressure determination section determines that the pressure detected by the pressure detector is larger than the atmosphere pressure.

In addition, a vehicle speed detector may be provided to detect a vehicle speed, and the controller may control the pressure-regulating valve based on the vehicle speed detected by the vehicle speed detector. In this case, the controller may include a vehicle-speed determination section configured to determine whether the vehicle speed detected by the vehicle speed detector is equal to or larger than a vehicle speed threshold, a first determination section configured to determine whether the acceleration value detected by the acceleration detector is larger than a first acceleration threshold, and a second determination section configured to determine whether the acceleration value detected by the acceleration detector is larger than a second acceleration threshold different from the first acceleration threshold. Furthermore, the controller causes the pressure-regulating valve to be opened, when the vehicle-speed determination section determines that the vehicle speed detected by the vehicle speed detector is equal to or larger than the vehicle speed threshold and when the first determination section determines that the acceleration value detected by the acceleration detector is larger than the first acceleration threshold. In addition, the controller causes the pressure-regulating valve to be opened, when the vehicle-speed determination section determines that the vehicle speed detected by the vehicle speed detector is smaller than the vehicle speed threshold and when the second determination section determines that the acceleration value detected by the acceleration detector is larger than the second acceleration threshold.

BRIEF DESCRIPTION OF THE DRAWINGS

The invention, together with additional objectives, features and advantages thereof, will be best understood from the following description, the appended claims and the accompanying drawings in which:

DETAILED DESCRIPTION

Embodiments of the invention will be described based on drawings.

(First Embodiment)

Figure 1:
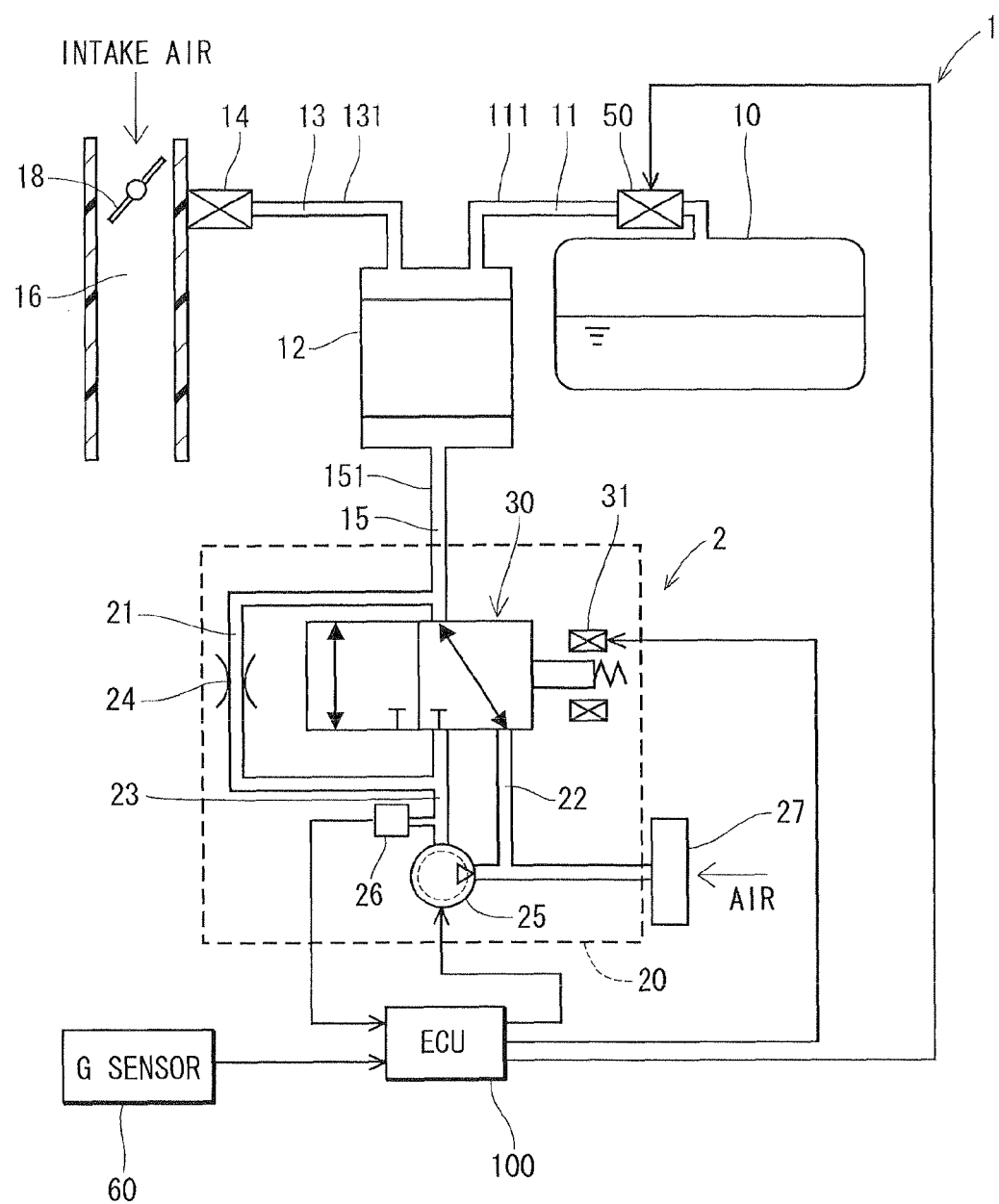
FIG. 1 is a schematic diagram showing a fuel vapor treatment apparatus according to a first embodiment of the present invention.

A fuel vapor treatment apparatus 1 according to a first embodiment of the invention is illustrated in FIG. 1. As shown in FIG. 1, in the fuel vapor treatment apparatus 1 of a vehicle, a fuel tank 10 and a canister 12 are connected to each other through a first purge pipe 111. The first purge pipe 111 defines a fuel passage 11 through which an inner space of the fuel tank 10 communicates with an interior of the canister 12 via a pressure-regulating valve 50. In the first purge pipe 111, the pressure-regulating valve 50 is provided to regulate fuel pressure in the fuel tank 10. The pressure-regulating valve 50 is electrically connected to an electronic control unit (hereinafter referred to as an "ECU") 100 described later. The canister 12 is connected to a portion adjacent to a throttle valve 18 of an intake passage 16 through a second purge pipe 131. The second purge pipe 131 defines a passage 13 through which the intake passage 16 communicates with the interior of the canister 12 via a purge valve 14 provided in the second purge pipe 131. The canister 12 is connected to a pump module 20 through a canister pipe 151. Fuel vapor generated in and released from the fuel tank 10 passes through the first purge pipe 111 and then is adsorbed into an adsorption agent made of an activated carbon in the canister 12. The purge valve 14 is an electromagnetic valve, and an amount of the fuel vapor purged from the canister 12 to the intake passage 16 is regulated by controlling an open amount of the purge valve 14. The first purge pipe 111 is an example of a passage forming member defining the fuel passage 11 through which the fuel tank 10 and the canister 12 communicate with each other.

A fuel-vapor leak check device 2 includes the pump module 20 and the ECU 100. The fuel-vapor leak check device 2 is configured to check a fuel leakage from the fuel tank 10.

An external air side of the canister 12 is connected to a switching valve 30 of the pump module 20 through a canister passage 15 of the canister pipe 151. The pump module 20 is a module in which the switching valve 30 and a pump 25 are integrally modularized. The switching valve 30 of the pump module 20 is an electromagnetic valve, for example. As shown in FIG. 1, when an electrical current applied to a coil 31 is turned off, the switching valve 30 connects the canister passage 15 and an air passage 22. A filter 27 is provided at an end portion of the air passage 22 on a side opposite to the switching valve 30. The filter 27 removes foreign material contained in air introduced from atmosphere.

If the electrical current applied to the coil 31 is turned on, the canister 12 and the pump 25 communicate with each other by the switching valve 30 through the canister passage 15 and a pump passage 23 without using a detection passage 21. A pressure sensor 26 is provided in the pump passage 23 to detect a pressure in the pump passage 23. A standard orifice 24 is provided in the detection passage 21 to have an open area which is set to correspond to an upper limit value of a permissible air leak amount including the fuel vapor from the fuel tank 10.

The ECU 100 is electrically connected to the pressure sensor 26 and a gravitation sensor (G sensor) 60. The ECU 100 is electrically connected to the pump 25 of the pump module 20, the coil 31 of the switching valve 30, and the pressure-regulating valve 50. The ECU 100 controls opening and closing of the pressure-regulating valve 50 based on a detection signal from the gravitation sensor 60. The gravitation sensor 60 can be used in common as an air-bag gravitation sensor provided for an air-bag which protects a passenger when a collision of the vehicle occurs. For example, the ECU 100 may be used as a controller controlling the pressure-regulating valve 50. The gravitation sensor 60 may be used as an acceleration detector which detects an acceleration value of the vehicle.

Figure 2:
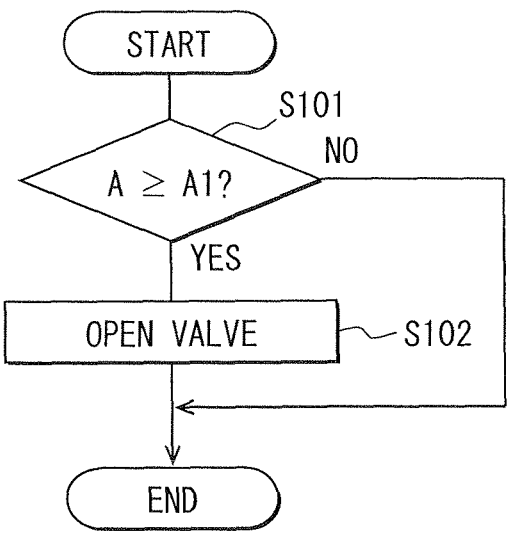
FIG. 2 is a flowchart relevant to control of a pressure-regulating valve in the fuel vapor treatment apparatus according to the first embodiment.

Operation of the fuel vapor treatment apparatus 1 according to the first embodiment will be described bellow. A control routine of the pressure-regulating valve 50 will be described with reference to FIG. 2. When the vehicle running, the pressure-regulating valve 50 repeats opening and closing depending on an environment condition of the fuel tank 10 or a state in the fuel tank 10. The gravitation sensor 60 detects an acceleration value A of the vehicle, and outputs the acceleration value A to the ECU 100. In the ECU 100, it is determined whether the acceleration value A detected by the gravitation sensor 60 is equal to or larger than a predefined first acceleration threshold A1 at step S101. When the acceleration value A is determined to be not smaller than the first acceleration threshold A1, the ECU 100 opens the pressure-regulating valve 50 at step S102. In contrast, when the detected acceleration value A is smaller than the first acceleration threshold A1, the pressure-regulating valve 50 is not opened and the control routine terminates.

Effects of the fuel vapor treatment apparatus 1 according to the first embodiment will be described bellow.

(i) When the vehicle is subjected to great impact force at a collision, the fuel tank 10 may be damaged by the impact force and may be broken by an internal pressure. The ECU 100 receives the acceleration value A detected by the gravitation sensor 60, and determines the magnitude relation between the acceleration value A and the first acceleration threshold A1. When it is determined that an acceleration value AH generated at the collision of the vehicle is equal to or larger than the first acceleration threshold A1, the ECU 100 opens the pressure-regulating valve 50. Accordingly, the fuel vapor in the fuel tank 10 is emitted into the canister 12. Therefore, a pressure in the fuel tank 10 decreases and breakage of the fuel tank 10 can be prevented.

(ii) The acceleration value A of the vehicle is generated also by a harsh braking of the vehicle. Generally, the fuel tank 10 is not broken by the harsh braking. An acceleration value AL generated in the harsh braking is generally smaller than the acceleration value AH generated at the collision of the vehicle. Thus, the first acceleration threshold A1 is set to be smaller than the acceleration value AH and be greater than the acceleration value AL. Accordingly, when the ECU 100 detects the acceleration value AL in the harsh braking, the pressure-regulating valve 50 is not opened based on the determination of the magnitude relation between the acceleration value AL and the first acceleration threshold A1. Therefore, the fuel vapor which does not cause the breakage of the fuel tank 10 can be saved in the fuel tank 10.

(iii) In the embodiment, the gravitation sensor 60 is used in common with an air-bag sensor provided for the vehicle for protecting a passenger when the collision occurs. Accordingly, it is not necessary to provide more than one gravitation sensor 60 and the number of vehicle components can be reduced.

(Second Embodiment)

Figure 3:
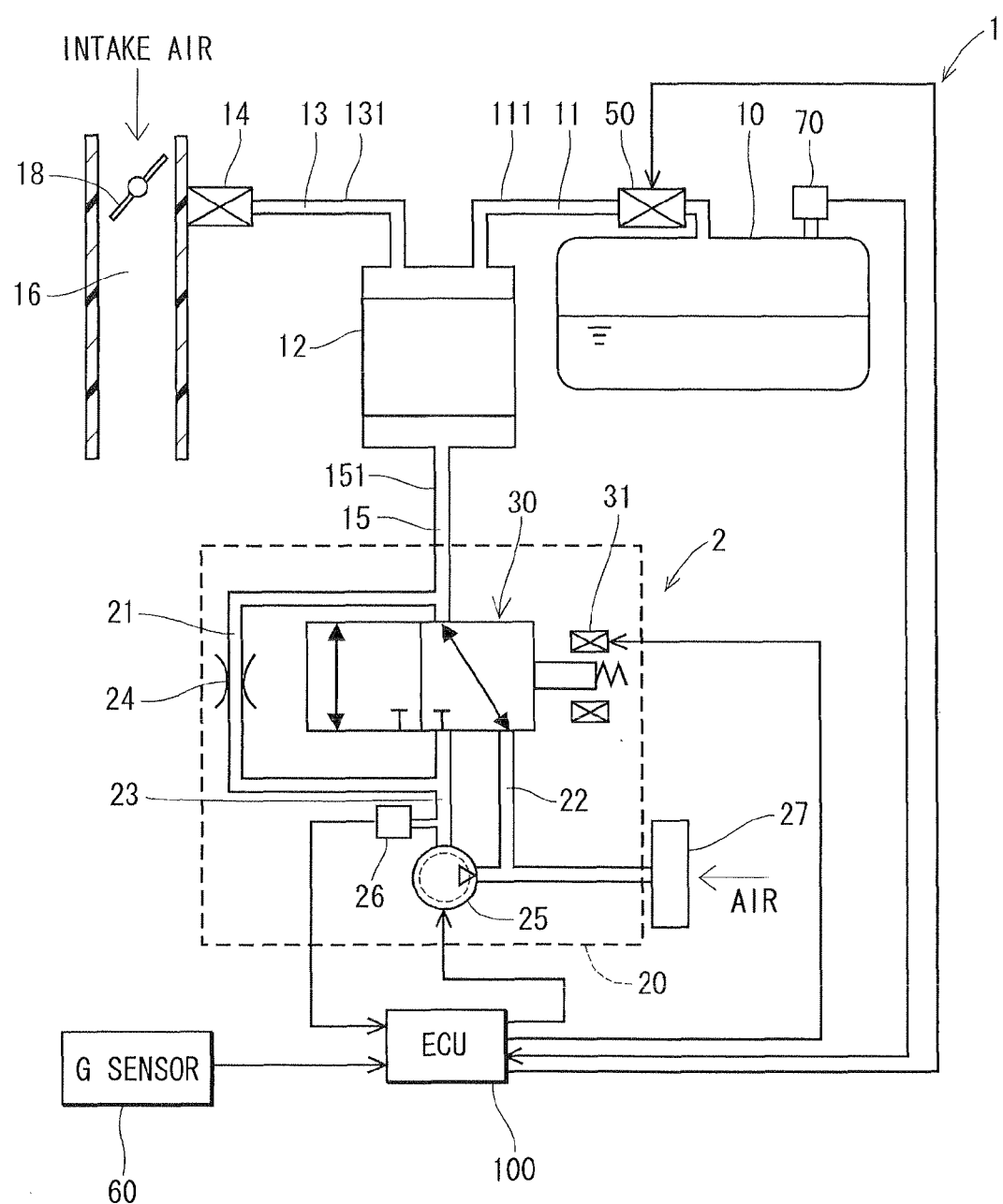
FIG. 3 is a schematic diagram showing a fuel vapor treatment apparatus according to a second embodiment of the present invention.

A second embodiment according to the invention will be described based on FIGS. 3 and 4. In a fuel vapor treatment apparatus 1 of the second embodiment, a fuel tank 10 is provided with a pressure detector, which detects a pressure in the fuel tank 10, with respect to the first embodiment. The substantially same part with the first embodiment is assigned with the same numeral, and the description of the part is omitted.

In the second embodiment, as an example of the pressure detector, a fuel-tank pressure sensor 70 is provided to detect the pressure in the fuel tank 10. The fuel-tank pressure sensor 70 is electrically connected to the ECU 100.

Operation of the fuel vapor treatment apparatus 1 according to the second embodiment will be described bellow. A control routine of the pressure-regulating valve 50 will be described referring to FIG. 4. The ECU 100 receives an acceleration value A detected by the gravitation sensor 60. Then, the ECU 100 compares the acceleration value A with a second acceleration threshold A2 and determines whether the acceleration value A is equal to or larger than the second acceleration threshold A2 at step S201. When the acceleration value A is not smaller than the second acceleration threshold A2 at step S201, a detection pressure P detected by the fuel-tank pressure sensor 70 is compared with an atmosphere pressure PA and it is determined whether the detection pressure P is larger than the atmosphere pressure PA at step S202. When the detection pressure P is larger than the atmosphere pressure PA, the pressure-regulating valve 50 is opened at step S203. In contrast, when the acceleration value A is smaller than the second acceleration threshold A2 or when the detection pressure P is not larger than the atmosphere pressure PA, the control routine of the pressure-regulating valve 50 terminates.

Effects of the fuel vapor treatment apparatus 1 according to the second embodiment will be described bellow. If the fuel tank 10 is damaged at a collision of a vehicle, the fuel tank 10 may be broken by fuel vapor in the fuel tank 10. In the second embodiment, the ECU 100 determines opening and closing of the pressure-regulating valve 50 based on the detection pressure P in the fuel tank 10 and the acceleration value A of the vehicle. When the detection pressure P in the fuel tank 10 is larger than the atmosphere pressure PA, the fuel tank 10 may be broken. At this time, the ECU 100 opens the pressure-regulating valve 50 and emits the fuel vapor from the fuel tank 10 into the canister 12. In contrast, when the detection pressure P is not larger than the atmosphere pressure PA, the fuel tank 10 is generally not broken by the detection pressure P of the fuel vapor in the fuel tank 10. Therefore, the ECU 100 does not open the pressure-regulating valve 50. Accordingly, the fuel vapor which does not cause breakage of the fuel tank 10 can be saved in the fuel tank 10. In the second embodiment, the other parts of the fuel vapor treatment apparatus 1 are similar to those of the above-described first embodiment.

(Third Embodiment)

Figure 5:
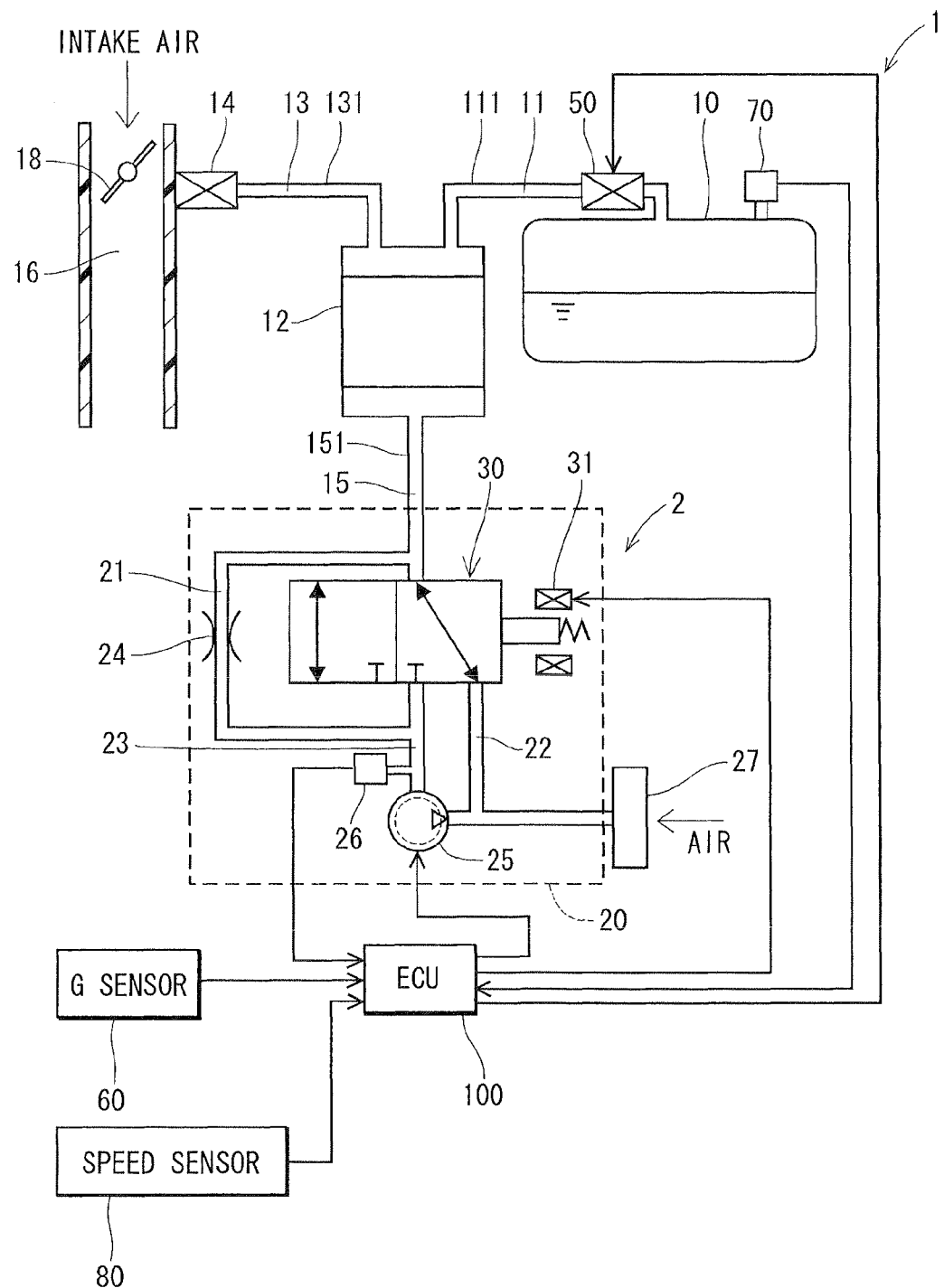
FIG. 5 is a schematic diagram showing a fuel vapor treatment apparatus according to a third embodiment of the present invention.

A third embodiment according to the invention will be described based on FIGS. 5 and 6. In a fuel vapor treatment apparatus 1 of the third embodiment, a vehicle speed detector, which detects a vehicle speed, is provided with respect to the second embodiment. The substantially same part with the first or second embodiment is assigned with the same numeral, and the description of the part is omitted.

In the third embodiment, as an example of the vehicle speed detector, a vehicle speed sensor 80 is provided to detect the vehicle speed. The vehicle speed sensor 80 is electrically connected to the ECU 100 and outputs the detected vehicle speed to the ECU 100.

Operation of a fuel vapor treatment apparatus 1 according to the third embodiment will be described bellow. A control routine of the pressure-regulating valve 50 will be described referring to FIG. 6. The ECU 100 receives a vehicle speed V detected by the vehicle speed sensor 80. Then, the ECU 100 compares the detected vehicle speed V with a vehicle speed threshold V1 and determines whether the vehicle speed V is equal to or larger than the vehicle speed threshold V1 at step S301. When the vehicle speed V is not smaller than the vehicle speed threshold V1, the ECU 100 receives an acceleration value A detected by the gravitation sensor 60. Then, the ECU 100 compares the acceleration value A with a third acceleration threshold A3 and determines whether the acceleration value A is equal to or larger than the third acceleration threshold A3 at step S302. When the acceleration value A is not smaller than the third acceleration threshold A3, the ECU 100 receives a detection pressure P detected by the fuel-tank pressure sensor 70. Then, the ECU 100 compares the detection pressure P with an atmosphere pressure PA and determines whether the detection pressure P is larger than the atmosphere pressure PA at step S303. When the detection pressure P is larger than the atmosphere pressure PA, the pressure-regulating valve 50 is opened at step S304. When the acceleration value A is smaller than the third acceleration threshold A3 at step S302 or when the detection pressure P is not larger than the atmosphere pressure PA at step S303, the control routine of the pressure-regulating valve 50 terminates.

When the vehicle speed V is smaller than the vehicle speed threshold V1 at step S301, the ECU 100 receives the acceleration value A detected by the gravitation sensor 60. Then, the ECU 100 compares the acceleration value A with a fourth acceleration threshold A4 and determines whether the acceleration value A is equal to or larger than the fourth acceleration threshold A4 at step S305. When the acceleration value A is not smaller than the fourth acceleration threshold A4, the ECU 100 receives the detection pressure P detected by the fuel-tank pressure sensor 70. Then, the ECU 100 compares the detection pressure P with the atmosphere pressure PA and determines whether the detection pressure P is larger than the atmosphere pressure PA at step S306. When the detection pressure P is larger than the atmosphere pressure PA, the pressure-regulating valve 50 is opened at step S304. When the acceleration value A is smaller than the fourth acceleration threshold A4 at step S305 or when the detection pressure P is smaller than the atmosphere pressure PA at step S306, the control routine of the pressure-regulating valve 50 terminates.

Effects of the fuel vapor treatment apparatus 1 according to the third embodiment will be described bellow. In the case where another vehicle collides with a vehicle, which stays on a line end of vehicles, from behind, the fuel tank 10 provided in the vehicle crashed from behind may be broken even if the acceleration value A is small. In the third embodiment, the ECU 100 controls opening and closing of the pressure-regulating valve 50 based on the vehicle speed V detected by the vehicle speed sensor 80. The fourth acceleration threshold A4 is set to be smaller than the third acceleration threshold A3. Hence, in the case where the vehicle, whose speed is smaller than the vehicle speed threshold V1, is crashed from behind, the ECU 100 determines opening or closing of the pressure-regulating valve 50 based on the fourth acceleration threshold A4 smaller than the third acceleration threshold A3. Therefore, breakage of the fuel tank 10 by the collision from behind can be prevented. In the third embodiment, the other parts of the fuel vapor treatment apparatus 1 are similar to those of the above-described first or second embodiment.

(Other Embodiments)

(i) In the above-described embodiments, the acceleration detector such as the gravitation sensor 60 is used in common with an acceleration sensor provided for a passenger protection system such as the air-bag. However, the acceleration detector may be not limited to the acceleration sensor for the passenger protection system and be provided separately from the acceleration sensor for the passenger protection system.

(ii) In the above-described second embodiment, the atmosphere pressure PA is adopted as a pressure threshold in the control routine of the pressure-regulating valve 50. However, the pressure threshold in the control routine of the pressure-regulating valve 50 may be not limited to the atmosphere pressure PA and may be set at a value larger than the atmosphere pressure PA.

(iii) In the above-described third embodiment, one vehicle speed threshold is set in the control routine of the pressure-regulating valve 50. However, plural vehicle speed threshold may be set in the control routine of the pressure-regulating valve 50.

Figure 4:
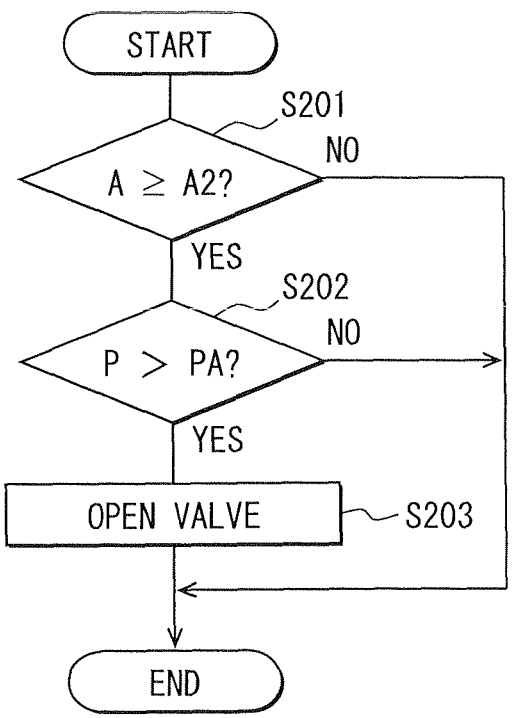
FIG. 4 is a flowchart relevant to control of a pressure-regulating valve in the fuel vapor treatment apparatus according to the second embodiment.
Figure 6:
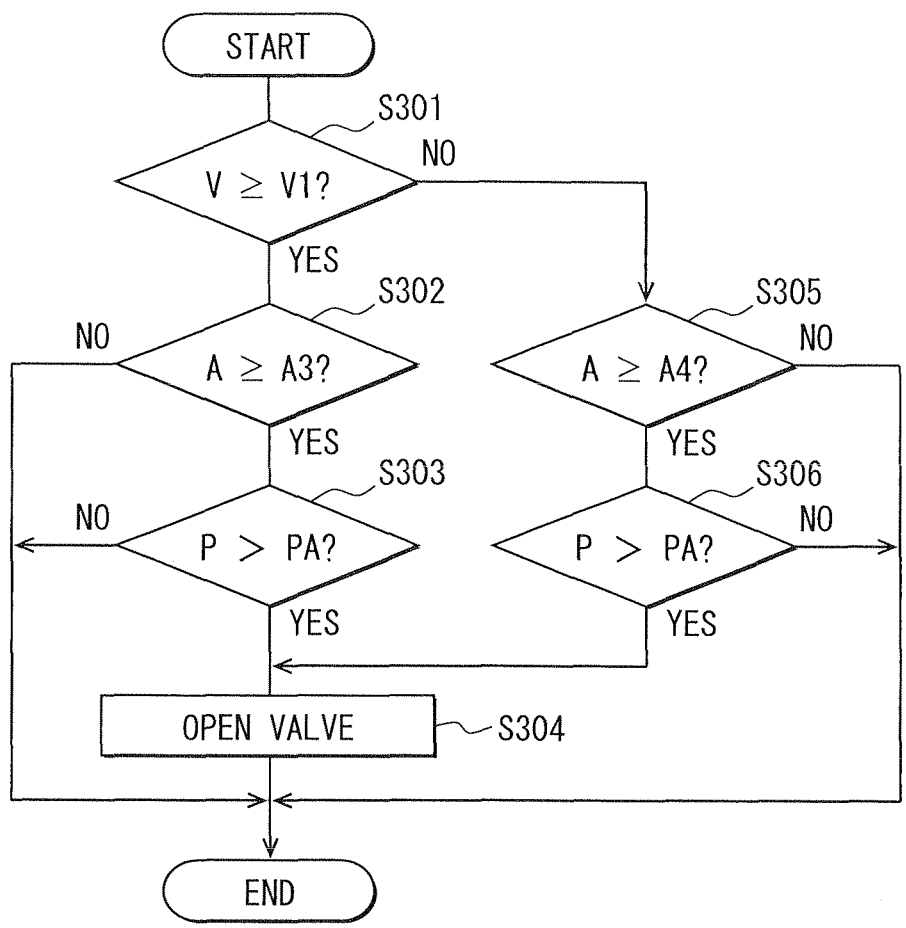
FIG. 6 is a flowchart relevant to control of a pressure-regulating valve in the fuel vapor treatment apparatus according to the third embodiment.

(iv) In the above-described second and third embodiments, as shown in FIGS. 4 and 6, the pressure determination is performed after the determination of acceleration value. However, in the control routine of the pressure-regulating valve 50, the determination of acceleration value may be performed after the pressure determination. For example, the determination of step S201 may be performed after the determination of step S202 in FIG. 4. Similarly, the determination of step S302 or S305 may be performed after the determination of step S303 or S306 in FIG. 6.

In the above-described embodiments, the fuel vapor treatment apparatus 1 according to the invention is typically used for a fuel supply device which supplies fuel to an engine of a vehicle. However, the invention is not limited to the above embodiments and is available as various configurations without departing from the scope of the invention.

Additional advantages and modifications will readily occur to those skilled in the art. The invention in its broader terms is therefore not limited to the specific details, representative apparatus, and illustrative examples shown and described.

What is claimed is:

1. A fuel vapor treatment apparatus comprising:
    a fuel tank for a storage of fuel to be supplied to an internal combustion engine for a vehicle;
    a canister disposed to recover fuel evaporated from the fuel tank;
    a passage forming member defining a passage through which the fuel tank and the canister communicate with each other;
    a pressure-regulating valve provided in the passage forming member to connect or disconnect the fuel tank and the canister;
    an acceleration detector provided to detect an acceleration value of the vehicle;
    a controller which controls the pressure-regulating valve based on the acceleration value detected by the acceleration detector; and
    a vehicle speed detector provided to detect a vehicle speed, wherein the controller controls the pressure-regulating valve based on the vehicle speed detected by the vehicle speed detector; wherein
    the controller includes a vehicle-speed determination section configured to determine whether the vehicle speed detected by the vehicle speed detector is equal to or larger than a vehicle speed threshold, a first determination section configured to determine whether the acceleration value detected by the acceleration detector is larger than a first acceleration threshold, and a second determination section configured to determine whether the acceleration value detected by the acceleration detector is larger than a second acceleration threshold different from the first acceleration threshold,
    the controller causes the pressure-regulating valve to be opened, when the vehicle-speed determination section determines that the vehicle speed detected by the vehicle speed detector is equal to or larger than the vehicle speed threshold and when the first determination section determines that the acceleration value detected by the acceleration detector is larger than the first acceleration threshold, and
    the controller causes the pressure-regulating valve to be opened, when the vehicle-speed determination section determines that the vehicle speed detected by the vehicle speed detector is smaller then the vehicle speed threshold and when the second determination section determines that the acceleration value detected by the acceleration detector is larger than the second acceleration threshold.

2. The fuel vapor treatment apparatus according to claim 1, wherein
    the controller includes an acceleration determination section configured to determine whether the acceleration value detected by the acceleration detector is larger than an acceleration threshold, and
    the controller causes the pressure-regulating valve to be opened when the acceleration determination section determines that the acceleration value detected by the acceleration detector is larger than the acceleration threshold.

3. The fuel vapor treatment apparatus according to claim 1, wherein the acceleration detector is provided for a passenger protection system for protecting a passenger at a collision of the vehicle.

4. The fuel vapor treatment apparatus according to claim 1, further comprising
    a pressure detector provided in the fuel tank to detect a pressure in the fuel tank, wherein the controller controls the pressure-regulating valve based on the pressure detected by the pressure detector.

5. The fuel vapor treatment apparatus according to claim 4, wherein
    the controller includes a pressure determination section configured to determine whether the pressure detected by the pressure detector is larger than an atmosphere pressure, and
    the controller causes the pressure-regulating valve to be opened when the pressure determination section determines that the pressure detected by the pressure detector is larger than the atmosphere pressure.

* * * * *